United States Patent
Meiser

(10) Patent No.: US 10,583,496 B2
(45) Date of Patent: Mar. 10, 2020

(54) METHOD FOR PRODUCING A GROOVE STRUCTURE IN AN INTERNAL SURFACE OF A PISTON

(71) Applicant: Mahle International GmbH, Stuttgart (DE)

(72) Inventor: Johann Meiser, Stuttgart (DE)

(73) Assignee: Mahle International GmbH (DE)

( * ) Notice: Subject to any disclaimer, the term of this patent is extended or adjusted under 35 U.S.C. 154(b) by 262 days.

(21) Appl. No.: 15/679,141

(22) Filed: Aug. 16, 2017

(65) Prior Publication Data

US 2018/0050394 A1    Feb. 22, 2018

(30) Foreign Application Priority Data

Aug. 17, 2016    (DE) .................. 10 2016 215 404

(51) Int. Cl.
| | | |
|---|---|---|
| *B23B 35/00* | (2006.01) | |
| *B23B 41/12* | (2006.01) | |
| *B23B 29/02* | (2006.01) | |
| *F16J 1/16* | (2006.01) | |
| *F16J 1/08* | (2006.01) | |

(Continued)

(52) U.S. Cl.
CPC ............. *B23B 29/02* (2013.01); *B23B 35/00* (2013.01); *B23B 41/12* (2013.01); *B23P 15/10* (2013.01); *F02F 3/00* (2013.01); *F16C 33/1065* (2013.01); *F16J 1/08* (2013.01); *F16J 1/16* (2013.01);

(Continued)

(58) Field of Classification Search
CPC ..... B23B 35/00; B23B 41/12; B23B 2215/24; B23B 2215/245; B23B 2220/12; B23B 2220/123
See application file for complete search history.

(56) References Cited

U.S. PATENT DOCUMENTS

| | | |
|---|---|---|
| 2,566,080 A | 8/1951 | Hans |
| 3,023,060 A | 2/1962 | Pachernegg |

(Continued)

FOREIGN PATENT DOCUMENTS

| | | |
|---|---|---|
| AT | 198069 B | 6/1958 |
| DE | 4316012 A1 | 11/1994 |

(Continued)

OTHER PUBLICATIONS

European Search Report dated Jan. 25, 2018 corresponding to related European Patent Application No. 17181709.

(Continued)

*Primary Examiner* — Alan Snyder
(74) *Attorney, Agent, or Firm* — Fishman Stewart PLLC

(57) ABSTRACT

A method for producing a groove structure in an internal surface of a pin bore of a piston may include providing a rotatable boring bar with at least one cutting tool; advancing the boring bar while rotating at a first rotational speed in a direction of rotation with a first feed speed into the pin bore and introducing at least one helical first groove of the groove structure with a first depth and a first width into the internal surface; and retracting the boring bar, subsequent to introducing the at least one helical first groove, from the pin bore with a second feed speed while maintaining rotation at a second rotational speed in the direction of rotation; during the retracting of the boring bar at least one helical second groove is introduced into the internal surface.

17 Claims, 2 Drawing Sheets

(51) Int. Cl.
 B23P 15/10 (2006.01)
 F16C 33/10 (2006.01)
 F02F 3/00 (2006.01)
(52) U.S. Cl.
 CPC ..... *B23B 2215/245* (2013.01); *B23B 2220/12* (2013.01); *F02F 2200/00* (2013.01)

(56) References Cited

U.S. PATENT DOCUMENTS

| | | |
|---|---|---|
| 5,630,953 A | 5/1997 | Klink |
| 5,782,585 A | 7/1998 | Bathen |
| 6,089,756 A | 7/2000 | Ono et al. |
| 9,482,275 B2 | 11/2016 | Rittman et al. |
| 2003/0150112 A1 | 8/2003 | Upadhya |
| 2010/0329801 A1 | 12/2010 | Liang |
| 2015/0174668 A1* | 6/2015 | Neufang .............. B23B 41/12 408/1 R |

FOREIGN PATENT DOCUMENTS

| | | |
|---|---|---|
| DE | 4442218 A1 | 5/1996 |
| DE | 102006050246 A1 | 4/2008 |
| DE | 102010031606 A1 | 1/2012 |
| GB | 2023238 A | 12/1979 |
| JP | 2012-052582 A | 3/2012 |

OTHER PUBLICATIONS

English abstract for DE-102006050246.
German Search Report for DE-102016215404.4, dated Mar. 30, 2017.

* cited by examiner

METHOD FOR PRODUCING A GROOVE STRUCTURE IN AN INTERNAL SURFACE OF A PISTON

CROSS-REFERENCE TO RELATED APPLICATION(S)

This application claims priority to DE 10 2016 215 404.4 filed on Aug. 17, 2016, the contents of which are hereby incorporated by reference in their entirety.

TECHNICAL FIELD

The present invention relates to a method for producing a groove structure in an internal surface of a pin bore of a piston. The invention, furthermore, relates to a piston of an internal combustion engine the pin bore of which is provided with a groove structure according to such a method.

BACKGROUND

Pistons usually have at least one pin bore in which a pin, for example for the purpose of connecting to a connecting rod, is rotatably mounted. In order to support the high loads that occur during the operation it is desirable to form a surface of the pin bore as smooth as possible. Although this results in the said better load bearing capacity of the pin bore, such flat surfaces nevertheless have a negative effect on the supply of the pin bore with a lubricant, which is needed for lubrication between the piston and the pin. In order to achieve a better lubrication it is known to provide the surface of the pin bore with grooves which serve as reservoir for the lubricant and thus improve the lubrication. Providing the surface with such types of grooves diminishes the proportion of the surface designed flat and thus the load bearing characteristics of the surface. In addition, such grooves offer an inadequate storage of lubricant.

For solving this problem, DE 10 2006 050 246 A1 and U.S. Pat. No. 6,089,756 A propose providing the surface of the pin bore with a groove structure, having deep grooves and grooves that are less deep. Both types of grooves serve for storing the lubricant, wherein the shallower grooves contribute more to the load bearing capacity of the surface. In the case of these pistons, the grooves of the groove structure are arranged in parallel or run in parallel. The depth of the respective groove can also vary along the associated groove.

From DE 44 42 218 A1 a fine boring machine for creating shaped bores with non-cylindrical geometry is known, in the case of which the bore radius can be varied through suitable activation in circumferential direction (ovality) and/or axial direction (trumpet shape). The fine boring machine includes as rotatable boring tool a boring bar with a cutting tool that is advanced into the bore and a work piece chuck that can be synchronously moved with the boring bar. With such a fine boring machine, a helical groove according to the present invention could be introduced into the inner surface of the bore upon suitable activation, for example constant radial deflection of the cutting tool and constant feed speed.

Disadvantageous with such groove structures according to the prior art is in particular their expensive production by means of a separate operation which leads to high production costs and/or production durations.

SUMMARY

The present invention therefore deals with the object of stating improved or at least alternative embodiments for a method for producing a groove structure in an internal surface of a pin bore of a piston and for such a piston, which are characterized in particular by a comparatively simplified production and/or reduced production costs and/or reduced production durations.

According to the invention, this object is solved through the subjects of the independent claim(s). Advantageous embodiments are subject of the dependent claims.

The present invention is based on the general idea of producing a groove structure in an internal surface of a pin bore of a piston by means of a boring tool consisting of a boring bar with one or more cutting tools, wherein the cutting tool, when the boring bar is advanced into the pin bore, introduces a first groove with a first depth and a first width $b_1$ into the internal surface and when the boring bar is subsequently retracted, a second groove of the groove structure with a second depth into the internal surface that is distinct from the first depth. Because of this, one such groove structure with grooves of different depth can thus be realized with the same tool, namely a single cutting tool attached to the boring bar. In addition, introducing the groove structure into the internal surface of the pin bore takes place in a simplified manner and with shortened duration since both when advancing the boring bar into the pin bore and also when advancing the boring bar out of the pin bore grooves are introduced into the internal surface of the pin bore. According to the inventive idea, the groove structure is produced in that such a boring bar is provided, which is rotatable. Here, the boring bar is rotated with a first rotational speed $n_1$ in a direction of rotation and advanced into the pin bore with a first speed or feed speed $v_1$. Alternatively, these and other relative movements could also be executed by a corresponding shifting of the piston in the work piece chuck based on a boring bar mounted fixed in place. At least one helical first groove with a first depth and a first width is introduced into the internal surface. According to the invention, the boring bar is subsequently retracted from the pin bore maintaining the rotational direction with a second rotational speed $n_2$ with a second speed or feed speed $v_2$, wherein when the boring bar is retracted at least one helical second groove of the groove structure with a second depth that is distinct from the first depth and a second depth $b_2$ is introduced into the internal surface.

By maintaining the direction of rotation it is not necessary, in particular, to halt the boring bar as a result of which the production of the groove structure in turn is simplified and shortened. Because of this, the at least one helical first groove and the at least one second helical groove additionally have opposing helix directions.

Introducing the respective groove into the internal surface of the pin bore is effected by a radial adjustment of the internal surface relative to the cutting tool. Here it is conceivable that the boring bar is provided with one or more radially adjustable cutting tools which are radially adjusted for introducing the grooves into the groove structure. It is also conceivable to realize introducing the grooves by a relative movement between the piston or the internal surface of the piston bore and the boring bar. Here it is conceivable, in particular, to move the piston relative to the cutting tool transversely to a corresponding axis of rotation of the boring bar and synchronously to its rotation. Likewise, the boring bar can be moved transversely to its axis of rotation.

The depth and the width of the respective groove are determined in particular by a corresponding adaptation of the adjustment of the boring tool relative to the internal surface to a rotational speed of the boring tool. Such an adaptation is effected in particular as described in DE 44 42 218 A1.

The different depth of the first and second groove can be achieved in different manners. Both grooves can be created by the same cutting tool when the same is adjusted in radial direction between the feed movement and the retraction movement of the boring bar so that it cuts into the internal surface of the pin bore with different depths. In this case, a synchronous movement of the piston or of the work piece chuck can be advantageously omitted.

Alternatively, a deeper (or shallower) second groove can be created in the internal surface through a movement of the piston that is synchronous to the rotation of the boring bar transversely to the axis of rotation and radial adjustment of the cutting tools when the piston, when the boring bar is retracted, is shifted in the machined location in each case in radial direction towards the cutting tool (or away from the same). In both cases, the width of the respective groove created also varies with the depth as a function of the geometry of the cutting tool.

When a synchronous work piece movement for creating a shaped bore with a non-cylindrical basic shape of the internal surface, as described in DE 44 42 218 A1, FIG. 2, is provided anyhow, a radial adjustment or adjustability of the cutting tool based on the boring bar can be advantageously omitted in such a case. In this case, the method can be varied so that when the boring bar is advanced, the desired non-cylindrical internal surface of the shaped bore with a first groove structure is created through suitable activation while during the retraction, the second groove is cut deeper by a constant value relative thereto.

Obviously, when retracting the boring bar a renewed travelling along the non-cylindrical internal surface could also be omitted and as second deeper groove simply a cylindrical groove shape be introduced when the depth of the same which now varies relative to the internal surface of the shaped bore can be accepted.

Furthermore, the second groove can also be created with a different depth by a separate second cutting tool which is also attached to the boring bar. After the boring bar has been moved in and the first groove created, the same can be radially extended in order to cut the second groove into the internal surface of the pin bore when the boring bar is retracted, while the first cutting tool, after the first groove has been created, can be radially retracted and disengaged. Advantageously, the geometries of the first and second groove can be configured entirely independently of one another using different cutting tools. A relatively wide flat first groove and a deeper but narrower second groove can be combined for example, which is not possible with a single cutting edge that engages with different depths during the advance and the retraction.

In a preferred embodiment, it is not only the direction of rotation but also the rotational speed of the boring bar that remains the same during the advance and the retraction ($n_1=n_2$). For achieving desired pitches of the first and second helical grooves, only the feed speeds $v_1$, $v_2$ need to be adapted in this case. According to the relationship $g_i=v_i/n_i$, the pitch g however can be alternatively or additionally influenced also by the respective boring bar rotational speed, in particular when the first rotational speed does not correspond to the second rotational speed ($n_1 \neq n_2$). In principle, the boring bar can be moved with any first feed speed $v_1$ and/or second feed speed $v_2$.

With preferred embodiments, the second feed speed $v_2$, with which the boring bar is retracted from the pin bore, is greater than the first feed speed $v_1$, with which the boring bar is advanced into the pin bore. This means that the boring tool is retracted with a second speed that is higher compared with the first speed while maintaining the direction of rotation. Because of this, the second groove with rotational speed $n_1=n_2$ remaining the same has a greater pitch or a greater pitch than the at least one first groove. Accordingly, the proportion of the internal surface that is provided with the at least one second groove can be smaller than the proportion of the internal surface that is provided with the at least first groove.

It is preferred when the second depth of the at least one second groove is greater than the first depth of the at least one first groove. This means that when the boring tool is retracted at least one such helical second groove of the groove structure is introduced into the internal surface with a second depth that is greater than the first depth. Because of this, the groove structure thus has at least one such second groove that is formed deeper than the at least one first groove. Accordingly, more lubricant can be stored in the region of the at least one second groove while in the region of the at least one first groove more load bearing proportion for a pin mounted in the pin bore is provided.

In a preferred embodiment, both an adequate lubricant supply and also an adequately high load bearing proportion of the internal surface for absorbing the gas pressure load can be achieved when the deeper groove serving as lubricant reservoir takes up at least 25% and maximally 50%, particularly preferably approximately 40% of the internal surface. As a ratio of width and pitch of the second groove, this corresponds to: $0.25 \leq b_2/g_2 \leq 0.5$, or $b_2/g_2 \approx 0.4$.

According to preferred embodiments, the second width of the at least one second groove is greater than the first width of the at least one first groove. This means that when the boring bar is retracted at least one such helical second groove of the groove structure is introduced into the internal surface with a second width that is greater than the first width. However it is also possible either with the same cutting tool cutting in less deep or with another cutting tool to achieve a smaller width of the second groove compared with the width of the first groove.

In an advantageous embodiment, the second groove is deeper than the first groove. This means that initially when the boring bar is advanced, the entire internal surface of the pin bore is provided with the flatter first groove structure while during the subsequent retraction, deeper second grooves with preferentially greater pitch are introduced. In this way it is avoided that (upon reverse order) the cutting tool when cutting the flat first groove enters the already existing deeper second groove and the respective concomitant change of the force acting on the cutting tool can negatively affect the machining quality.

With the method according to the invention it is possible in principle to introduce first grooves and second grooves with any depth into the internal surface of the pin bore.

It is preferred when the first groove is introduced into the internal surface with a depth of preferably approximately 1 μm. The second depth of the at least one second groove preferably amounts to 20 μm, particularly preferably approximately 5 μm.

The rotational speed with which the boring bar is rotated can basically be any provided that the rotational speed is adapted to the remaining movement parameters insofar as the grooves are introduced into the internal surface with the desired depth and/or width and/or pitch or pitch.

Here, the rotational speed of the boring bar can vary in particular between the advance and the retraction. This means that the first rotational speed $n_1$ and the second rotational speed $n_2$ can vary each or relative to one another.

It is to be understood that besides the method for producing the groove structure in the internal surface of the pin bore of the piston a piston produced with the method according to the invention also forms part of the scope of this invention, which in the internal surface of a pin bore has two helical grooves of different depth with opposite direction of rotation.

The piston is employed in an internal combustion engine. By way of the pin bore, the piston can be connected in particular to a connecting rod, for the purpose of which an associated pin is mounted in the pin bore.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

DETAILED DESCRIPTION

Figure 1:
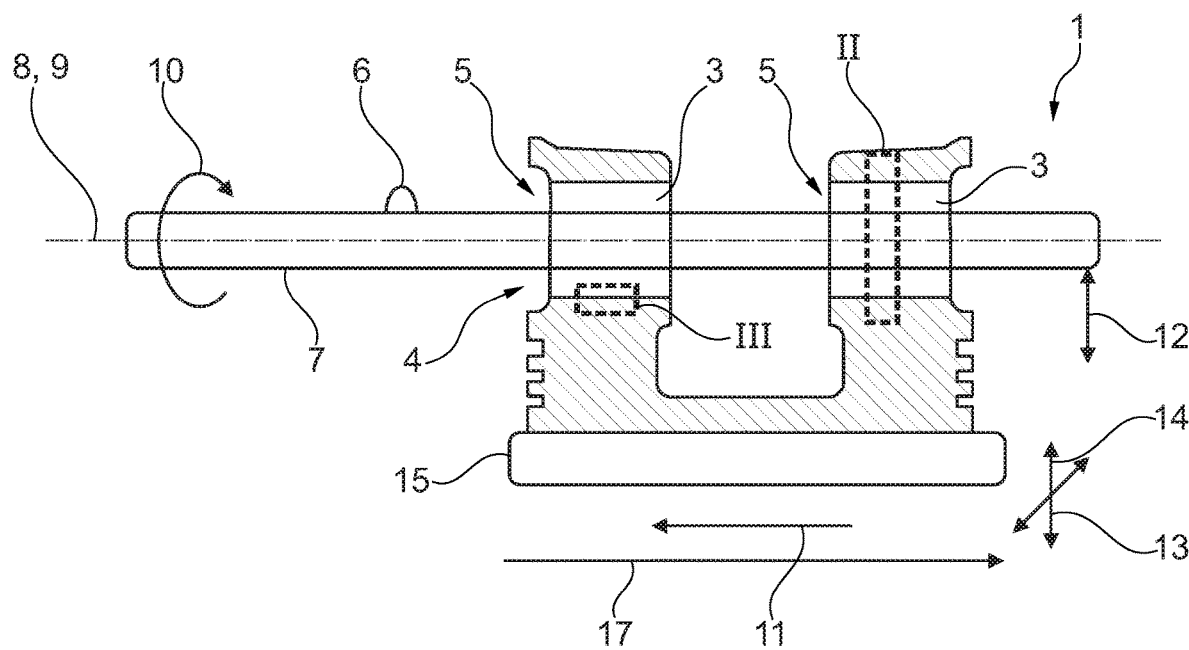
FIG. 1 schematically shows a section through a piston of an internal combustion engine during the production of a groove structure, FIG. 2 schematically shows the region from FIG. 1 marked with II after the production of the groove structure, FIG. 3 schematically shows the region from FIG. 1 marked with III after the production of the groove structure.
Figure 2:
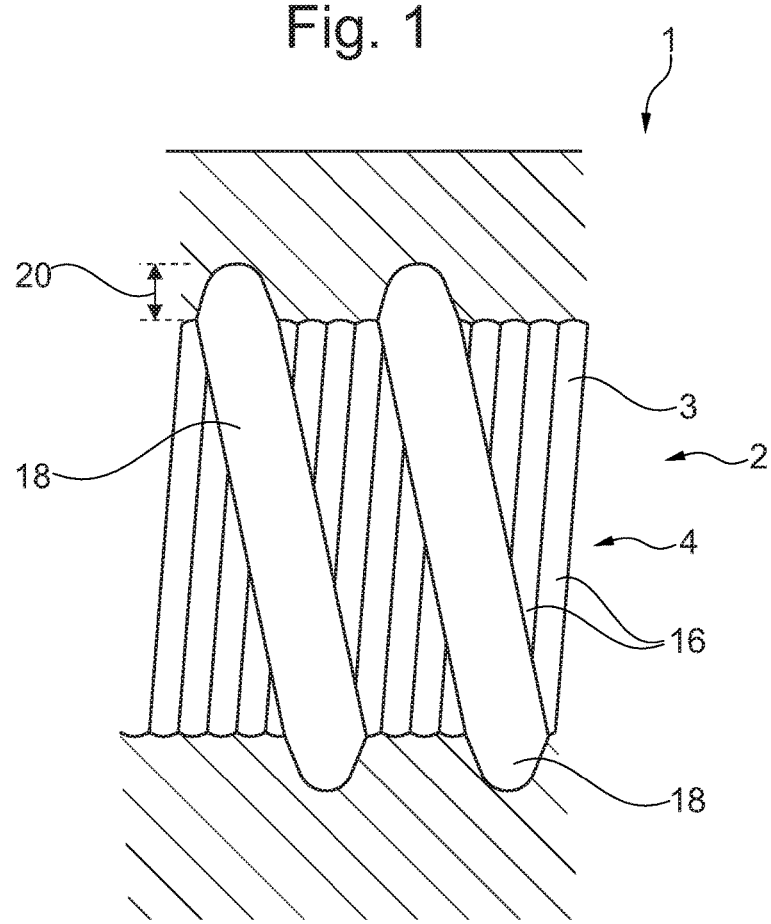

In FIG. 1, a piston 1 of an internal combustion engine which is not shown is represented in section, wherein in FIG. 1 a state during the production of a groove structure 2 (see FIGS. 2 and 3) is visible. FIG. 2 shows the region in FIG. 1 marked with II after the production of the groove structure 2, while in FIG. 3 the region in FIG. 1 marked with III is shown after the production of the groove structure 2.

The groove structure 2 is introduced into an internal surface 3 of a pin bore 4 of the piston 1, wherein the pin bore 4 has two bore sections 5 which are aligned with one another. For providing the internal surface 3 of the pin bore 4 with the groove structure 2, a boring tool with a cutting tool 6 is initially provided, which is attached to a boring bar 7 in a rotationally fixed manner, which is rotated in a direction of rotation 10 about an axis of rotation 8 which corresponds to the axis 9 of the boring bar 7. Because of this, the cutting tool 6 is also rotated in the direction of rotation 10. The boring bar 7 is initially advanced into the pin bore 4 in an advancing direction 11, while it rotates in the direction of rotation 10. During the advancing of the boring bar 7 into the pin bore 4, a relative radial movement between the cutting tool 6 and the internal surface 3 of the pin bore 4 additionally occurs. This can take place through a radial movement of the boring bar 7 and thus of the cutting tool 6 indicated by an arrow 12. Alternatively or additionally, the piston 1 can be moved in a first movement direction 13 running transversely to the axis of rotation 8 and/or in a second movement direction 14 running transversely to the axis of rotation 8 and transversely to the first movement direction 13. The movement of the piston 1 in the first movement direction 13 and/or second movement direction 14 can be realized with the help of a chuck 15, in which the piston 1 is held. When the boring bar 7 is advanced into the pin bore 4, at least one helical first groove 16 (see FIG. 2 and FIG. 3) is introduced into the internal surface 3 of the pin bore 4 through said relative radial movement between the cutting tool 6 and the internal surface 3. Here, a state during the production of the groove structure 2 is visible in FIG. 1, during which the boring bar 7 has already been advanced into the pin bore 4 entirely and has emerged from the pin bore 4 in the advancing direction 11. Here, the first grooves 16 are not shown in FIG. 1. Following this, the boring bar 7 continues to be rotatingly moved in a rotation direction 10 however in a retraction direction 17 that is opposite to the advancing direction 11, as a result of which the cutting tool 6 passes through the pin bore 4 a second time, while the boring bar 7 is retracted from the pin bore 4. During the retraction of the boring bar 7 from the pin bore 4, at least one helical second groove 18 of the groove structure 2 is introduced into the internal surface 3 of the pin bore 4 through said relative radial movement of the boring bar 7 or of the cutting tool 6 to the internal surface 3. Here, the helix direction of rotation of the at least one first groove 16 and of the at least one second groove 18 is opposite to the at least one groove 16 and the at least one second groove 18. In the shown example, a single such first groove 16 and a single such second groove 18 are introduced in the respective boring section 5 of the pin bore 4, and helically extend substantially along the entire associated bore section 5.

Figure 3:
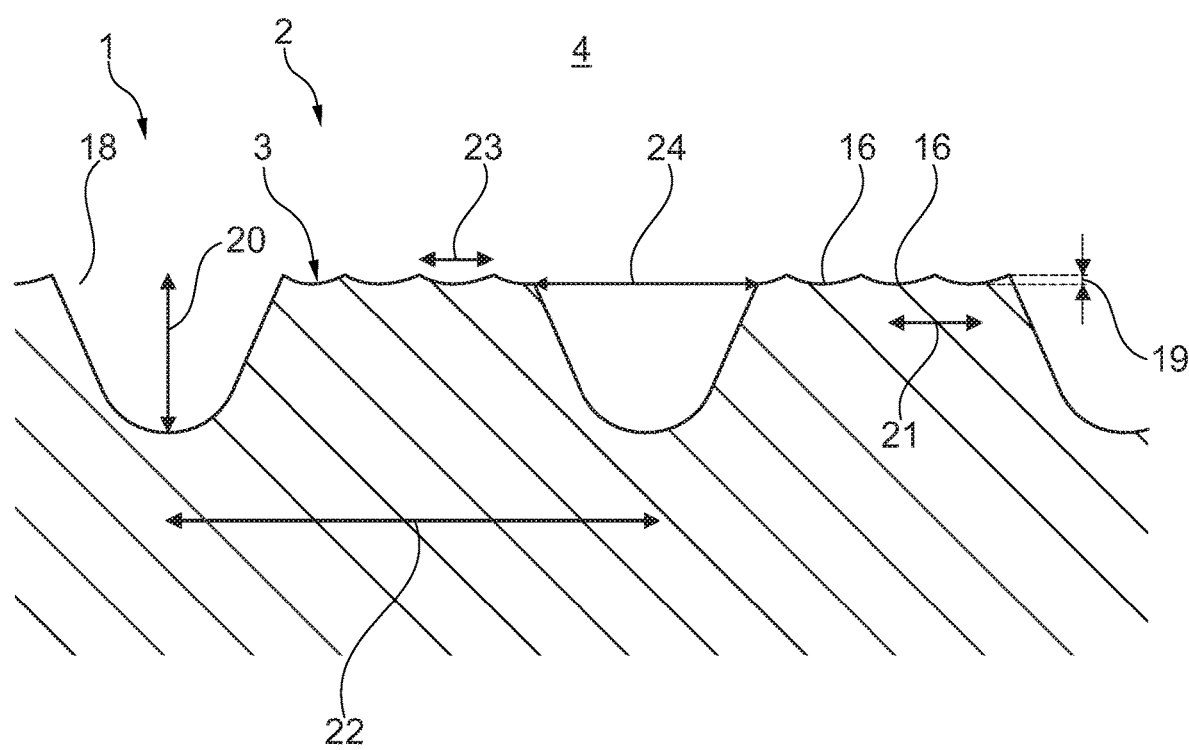

Here, the first groove 16 and the second groove 18 have different depths 19, 20 running radially (see FIG. 3). This means that the first groove 16 has a first depth 19, which is distinct from a second depth 20 of the second groove 18. In the shown exemplary embodiment, the second depth 20 is greater than the first depth 19.

Advancing the boring bar 7 into the pin bore 4 is effected with a first feed speed while the retracting of the boring bar 7 from the pin bore 4 takes place with a second feed speed, which differs from the first feed speed. Because of this, the at least one second groove 18 has a pitch 22 other than that of the at least one groove 16. This means that a first pitch 21 of the first groove 16 differs from a second pitch 22 of the second groove 18, wherein the second pitch 22 in the shown example is greater than the first pitch 21. This is achieved in particular with unchanged rotational speed of the boring bar 7 in that the second feed speed is higher than the first feed speed. This circumstance is symbolized by the arrow of the advancing direction 11 being shorter than the arrow of the extraction direction 17 in FIG. 1.

In addition, the first groove 16 additionally has a first width 23 running parallel to the axis of rotation 9 or in advancing direction 11 or extraction direction 17, which differs from a corresponding second width 24 of the second groove 18, wherein the second width 24 in the shown example is greater than the first width 23.

In the shown example, the depth 19, 20, the pitch 21, 22 and the width 23, 24 of the respective groove 16, 18 are substantially constant. However it is to be understood that the depth 19, 20 and/or the pitch 21, 22 and/or the width 23, 24 of the respective groove 16, 18 can vary in particular along the associated groove 16, 18.

The invention claimed is:

1. A method for producing a groove structure in an internal surface of a pin bore of a piston, comprising:

providing a rotatable boring bar with at least one cutting tool;

advancing the boring bar while rotating at a first rotational speed in a direction of rotation with a first feed speed into the pin bore and introducing at least one helical first groove of the groove structure with a first depth and a first width into the internal surface; and retracting the boring bar, subsequent to introducing the at least one helical first groove, from the pin bore with a second feed speed while maintaining rotation at a second rotational speed in the direction of rotation wherein during the retracting of the boring bar at least one helical second groove of the groove structure with a second depth that is distinct from the first depth is formed into the internal surface.

2. The method according to claim 1, wherein the second feed speed at which the boring bar is retracted from the pin bore is distinct compared with the first feed speed.

3. The method according to claim 1, wherein when the boring bar is retracted the second depth of the at least one such helical second groove of the groove structure is formed greater than the first depth.

4. The method according to claim 1, wherein, when retracting the boring bar from the pin bore, the at least one helical second groove is provided with a second width that is greater than the first width.

5. The method according to claim 1, wherein, when retracting the boring bar from the pin bore, the at least one helical second groove is provided with a second width that is smaller than the first width.

6. The method according to claim 1, wherein, when retracting the boring bar from the pin bore, the at least one helical second groove of the groove structure is provided with a second pitch that is greater than a first pitch of the at least one helical first groove.

7. The method according to claim 1, further comprising forming the internal surface of the pin bore as a shaped bore during the introducing of the at least one helical first groove by varying a radius in at least one of a circumferential direction and an axial direction.

8. The method according to claim 1, wherein retracting the boring bar rom the pin bore provides the at least one second groove with a second pitch and a second width, wherein the second width ranges from 25% to 50% of the second pitch.

9. The method according to claim 8, wherein the second width is approximately 40% of the second pitch.

10. The method according to claim 1, wherein the at least one helical first groove is introduced into the internal surface via the at least one cutting tool and the at least one helical second groove is introduced into the internal surface via another cutting tool attached to the boring bar.

11. The method according to claim 1, wherein at least one of:
the first depth of the at least one helical first groove is up to 2 µm; and
the second depth of the at least one helical second groove is up to 20 µm.

12. The method according to claim 1, wherein the second feed speed at which the boring bar is retracted is higher than the first feed speed.

13. The method according to claim 1, wherein at least one of the first depth is approximately 1 µm and the second depth is approximately 5 µm.

14. A method for producing a groove structure for a piston, comprising:

providing a rotatable boring bar with at least one cutting tool;

advancing the boring bar at a first feed speed into a pin bore and rotating the boring bar at a first rotational speed in a rotation direction while advancing the boring bar to provide at least one first helical first groove with a first depth and a first width in an internal surface of the pin bore; and retracting the boring bar from the pin bore at a second feed speed while rotating the boring bar at a second rotational speed in the rotation direction to form at least one helical second groove with a second depth that is distinct from the first depth and a second width that is distinct from the first width.

15. The method according to claim 14, wherein the second feed speed at which the boring bar is retracted is greater than the first feed speed at which the boring par is advanced.

16. The method according to claim 14, wherein retracting the boring bar from the pin bore further forms the at least one helical second groove with a second pitch that is greater than a first pitch of the at least one helical first groove.

17. The method according to claim 14, wherein advancing the boring bar into the pin bore includes forming the internal surface of the pin bore as a shaped bore by varying a radius of the pin bore in at least one of a circumferential direction and an axial direction.

* * * * *

UNITED STATES PATENT AND TRADEMARK OFFICE
CERTIFICATE OF CORRECTION

PATENT NO. : 10,583,496 B2
APPLICATION NO. : 15/679141
DATED : March 10, 2020
INVENTOR(S) : Johann Meiser Page 1 of 1

It is certified that error appears in the above-identified patent and that said Letters Patent is hereby corrected as shown below:

In the Claims

At Column 7, Claim number 3, Line number 21, please remove the word "such".

Signed and Sealed this
Twenty-first Day of July, 2020

Andrei Iancu
*Director of the United States Patent and Trademark Office*